(12) United States Patent
Skeens et al.

(10) Patent No.: US 6,581,641 B2
(45) Date of Patent: Jun. 24, 2003

(54) ONE-WAY VALVE FOR USE WITH VACUUM PUMP

(75) Inventors: Janet L. Skeens, San Carlos, CA (US); Gerald W. Sweeney, La Jolla, CA (US)

(73) Assignee: Illinois Tool Works Inc., Glenview, IL (US)

( * ) Notice: Subject to any disclaimer, the term of this patent is extended or adjusted under 35 U.S.C. 154(b) by 123 days.

(21) Appl. No.: 09/828,347

(22) Filed: Apr. 5, 2001

(65) Prior Publication Data

US 2002/0144740 A1 Oct. 10, 2002

(51) Int. Cl.$^7$ .......................... F16K 15/14; B65B 31/06; B65D 30/24
(52) U.S. Cl. .......................... 137/845; 137/1; 137/15.18; 137/843; 251/149.1; 206/524.8; 99/472
(58) Field of Search .................. 53/434, 512; 99/472; 137/512.15, 843, 845, 852, 907, 1, 15.18; 141/65; 206/524.8; 251/149.1, 149.7; 383/95

(56) References Cited

U.S. PATENT DOCUMENTS

| 4,337,804 A | * | 7/1982 | Maruscak .................... 141/313 |
| 4,584,182 A | | 4/1986 | Sanderson et al. |
| 5,121,590 A | | 6/1992 | Scanlan |
| 5,142,970 A | * | 9/1992 | ErkenBrack ............... 206/524.8 |
| 5,450,963 A | * | 9/1995 | Carson ........................ 206/522 |
| 5,480,030 A | | 1/1996 | Sweeney et al. |
| 5,556,005 A | * | 9/1996 | Banks .......................... 222/105 |
| 5,651,470 A | * | 7/1997 | Wu .............................. 141/65 |
| 5,941,391 A | * | 8/1999 | Jury ............................ 137/223 |
| 6,059,457 A | * | 5/2000 | Sprehe et al. ............. 206/524.8 |
| 6,070,397 A | * | 6/2000 | Bachhuber ................... 141/329 |

FOREIGN PATENT DOCUMENTS

| GB | 856544 | * 12/1960 |
| WO | WO 98/32670 | 7/1998 |

* cited by examiner

Primary Examiner—Michael Powell Buiz
Assistant Examiner—Ramesh Krishnamurthy
(74) Attorney, Agent, or Firm—Mark W. Croll; John H. Pilarski

(57) ABSTRACT

A valve assembly mounted in a resealable/reclosable storage bag. The valve assembly includes a base and a valve element. The valve element includes a stem with a convex cap attached at one end and a valve gate attached at the opposite end. The stem extends into a hole in the base. The resilient quality of the cap, acting against the top of the base, holds the gate against the bottom of the base, thereby forming a seal between the gate and the base that is strong enough to preserve the vacuum inside the bag. A cavity extends into the stem from the cap end. A hole in the stem runs from the cavity to outside the stem. When the stem is pressed down, a vacuum source may draw air between the gate and the base, through the hole in the stem, into the cavity, and subsequently outside the bag.

25 Claims, 4 Drawing Sheets

ONE-WAY VALVE FOR USE WITH VACUUM PUMP

BACKGROUND

1. Field of Invention

The present invention relates to evacuable storage containers, and in particular to air valves used in evacuable storage containers.

2. Related Art

Present evacuable food containers evacuate air from the container through the same opening through which food is placed into the container. Once the vacuum is established inside the container, the opening is permanently sealed. To access the container's contents, the container must be cut open. To reuse the container, air is evacuated through the newly cut opening, and the container is again permanently sealed. Unfortunately, the container becomes smaller each time the container is opened, evacuated, and resealed. Eventually the container becomes too small for use and must be discarded. The result is a considerable waste of material and money.

What is required, therefore, is a flexible, evacuable food container that may be reused without progressively destroying the container.

SUMMARY

A storage system includes a bag having a resealable/reclosable seal at an opening through which material is placed inside the bag. A valve assembly is mounted in a side of the bag. The bag is sealed and a vacuum source is used to draw air through the valve assembly, thereby creating a vacuum inside the bag. The vacuum inside the bag helps to preserve material or items stored inside the bag.

The valve assembly includes a base and a valve element. The valve element has a stem and a convex, resilient cap attached to the top of the stem. The bottom of the stem extends into a hole in the base and is kept from moving completely through the base by the distal rim or end of the cap. A valve gate is connected to the bottom of the stem via a neck portion of the stem. The resilient quality of the cap tends to pull the stem up through the hole in the base, thereby pulling the outer portion of the valve gate against the bottom of the base. The stem includes a cavity that extends into the stem from the top end. At least one hole connects the cavity to an outer surface of the stem so that air may pass through the hole, into the cavity, and then outside the stem.

To open the valve assembly, the top end of the stem is pressed down towards the base. The resulting downwards stem movement opens the seal between the gate and the bottom of the base. A conventional vacuum source may then draw air from the interior of the bag, between the gate and the bottom of the base, through the hole in the stem, and through the cavity to outside the bag. When the top end of the stem is released, the resilient quality of the cap again pulls the stem upwards and seals the gate to the bottom of the base.

DETAILED DESCRIPTION

Figure 1:
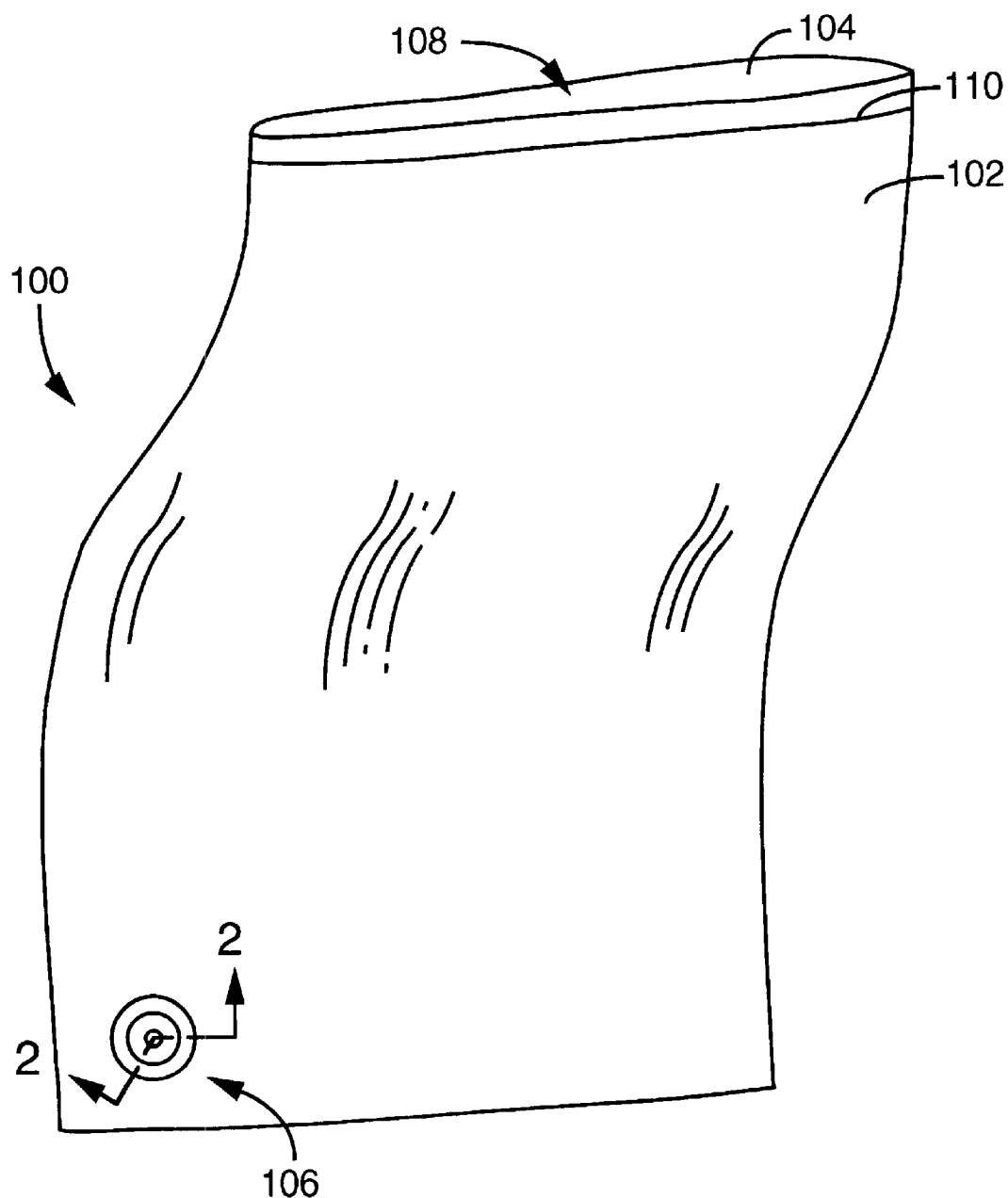
FIG. 1 is a front view of a storage bag having a valve assembly in accordance with the invention.

Identical reference numbers in the drawings accompanying the following description represent similar structures. The drawings are not necessarily to scale.

FIG. 1 is a front view of a storage system including a storage bag 100 in accordance with the invention. Bag 100 includes front sheet 102 and rear sheet 104 (hidden behind the front sheet) that are bonded at the sheet edges. Other bag or flexible container configurations may be used. Valve assembly 106, described in detail below, is mounted in front sheet 102 so that an airtight seal is formed between assembly 106 and sheet 102. Bag 100 also includes opening 108 between sheets 102 and 104. Reusable/reclosable zipper-type airtight seal 110 is positioned so that it may be opened, material (e.g., human-consumable food) may be placed into bag 100, and then seal 110 is closed to form an airtight seal between the interior and exterior of bag 100. In some embodiments, sheets 102 and 104 are made of material suitable for storing food for human consumption, such as polyethylene or nylon/polyethylene laminate. Seal 110 may be any reusable airtight seal, such as ones manufactured by the MINIGRIP® ZIP-PAK(® division of ILLINOIS TOOL WORKS INC. (ITW), located in Glenville Ill.

Figure 2:
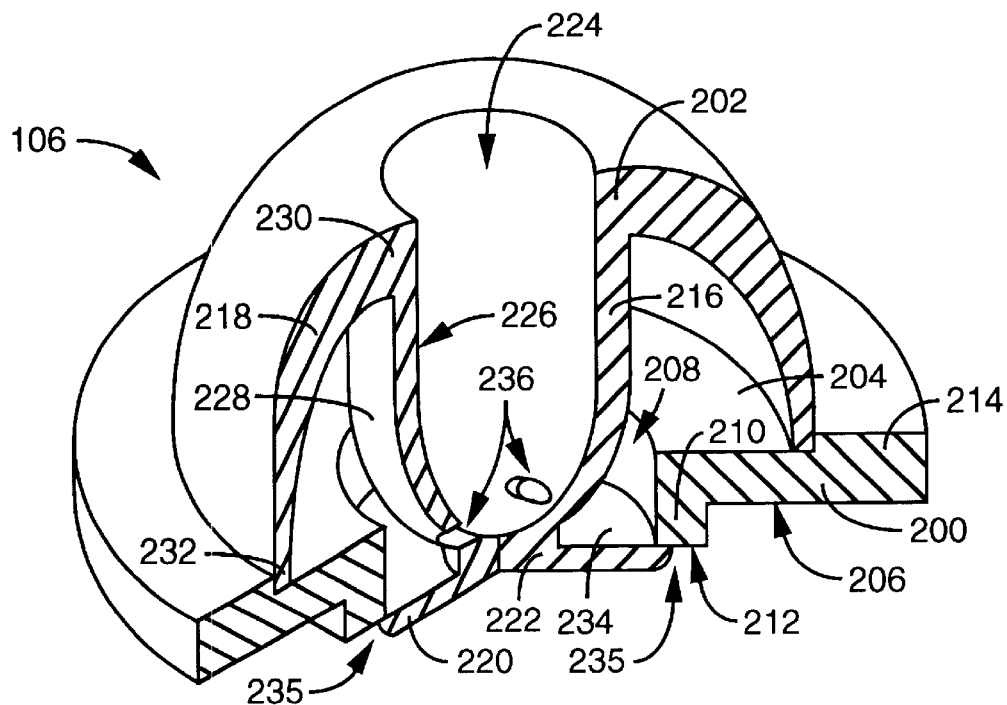
FIG. 2 is a cutaway perspective view taken along the cut line shown in FIG. 1.

FIG. 2 is a cutaway perspective view taken along the cut line shown in FIG. 1. Valve assembly 106 includes base 200 and valve element 202 mounted on base 200. Base 200 and valve element 202 are in some embodiments formed using conventional injection molding, and may be formed of material such as conventional polyethylene, polyvinylchloride (PVC), acrylonitrile-butadiene-styrene (ABS), or other material commonly used for forming such structures. Valve assembly 106 is assembled by pressing valve element 202 into base 200.

Base 200 includes a top surface 204, a bottom surface 206, and a hole 208 that extends through base 200. Annular valve seat 210 is formed on bottom surface 206, adjacent hole 208, and includes valve seat surface 212. Annular retaining lip 214 is formed on top surface 204. In some embodiments the diameter of hole 208 is approximately ⅜ inch and the diameter of base 200 is approximately 1 inch, although other sizes may be used. In some embodiments either or both seat 210 and lip 214 may be eliminated.

Valve element 202 includes stem 216, resilient, convex cap 218, valve gate 220, and stem neck 222. Cavity 224 is defined in stem 216 and is open at the top. Thus stem 216 has an inner surface 226 and an outer surface 228. In some embodiments the outer diameter of stem 216 is slightly smaller than the diameter of hole 208.

Cap 218 includes a middle portion 230 and a distal rim or end portion 232. Cap 218 is attached to stem 216 at middle portion 230. When cap 218 is assembled into base 200, distal portion 232 engages retaining lip 214. In some embodiments, however, lip 214 is omitted. Cap 218 is made of a resilient material, such as polyethylene, so that as stem 216 is forced down towards hole 208 the resilient quality of cap 218 tends to restore stem 216 up to its starting position. Valve gate 220 prevents stem 216 from moving too far out of hole 208.

Gate 220 is connected via neck 222 to the bottom of stem 216. The upward force from cap 218 holds surface 234 of gate 220 against valve seat face 212, thereby forming an airtight seal at 235. In some cases, gate 220 is formed as an integral part of element 202. In other cases, gate 220 is a separate piece, formed of a material different from element 202, which is conventionally joined to element 202.

In FIG. 2, two holes 236 (only one is required, but any number of holes may be used) are shown extending through stem 216 from cavity 224 to outer surface 228. When stem 216 is pressed down towards hole 208, holes 236 allow air to pass between gate surface 234 and seat face 212, and then into cavity 224.

Figure 3:
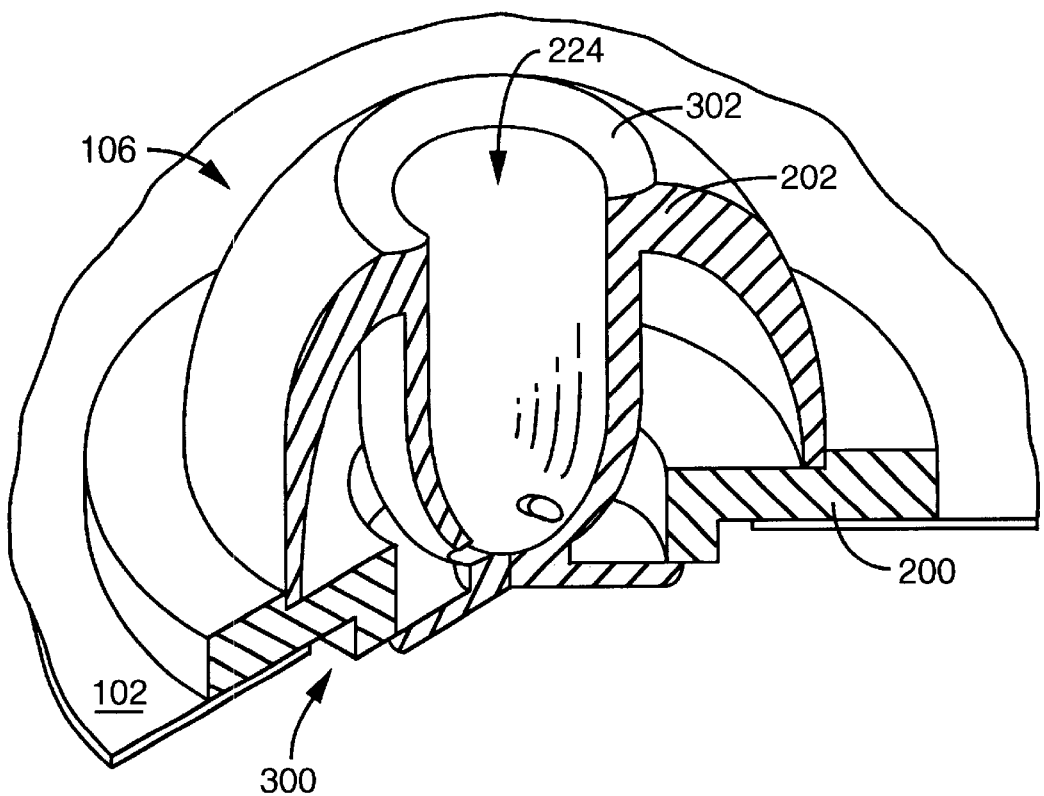
FIG. 3 is a cutaway perspective view showing another embodiment of the invention.

FIG. 3 is a cutaway perspective view showing another embodiment of the invention. As shown in FIG. 3, base 200 is mounted into hole 300 in sheet 102 of bag 100 (FIG. 1). In some embodiments base 200 is attached to sheet 102 using conventional thermal bonding, although other attachment methods such as adhesives may be used to form an airtight seal between sheet 102 and base 200.

FIG. 3 also shows annular beveled nozzle lip 302 formed around the top opening of cavity 224. In some embodiments lip 302 is sized to receive a nozzle from a vacuum source and helps prevent the nozzle from slipping off of valve element 202. Another advantage of lip 302 is that it may accommodate several different nozzle 400 diameters.

Figure 4:
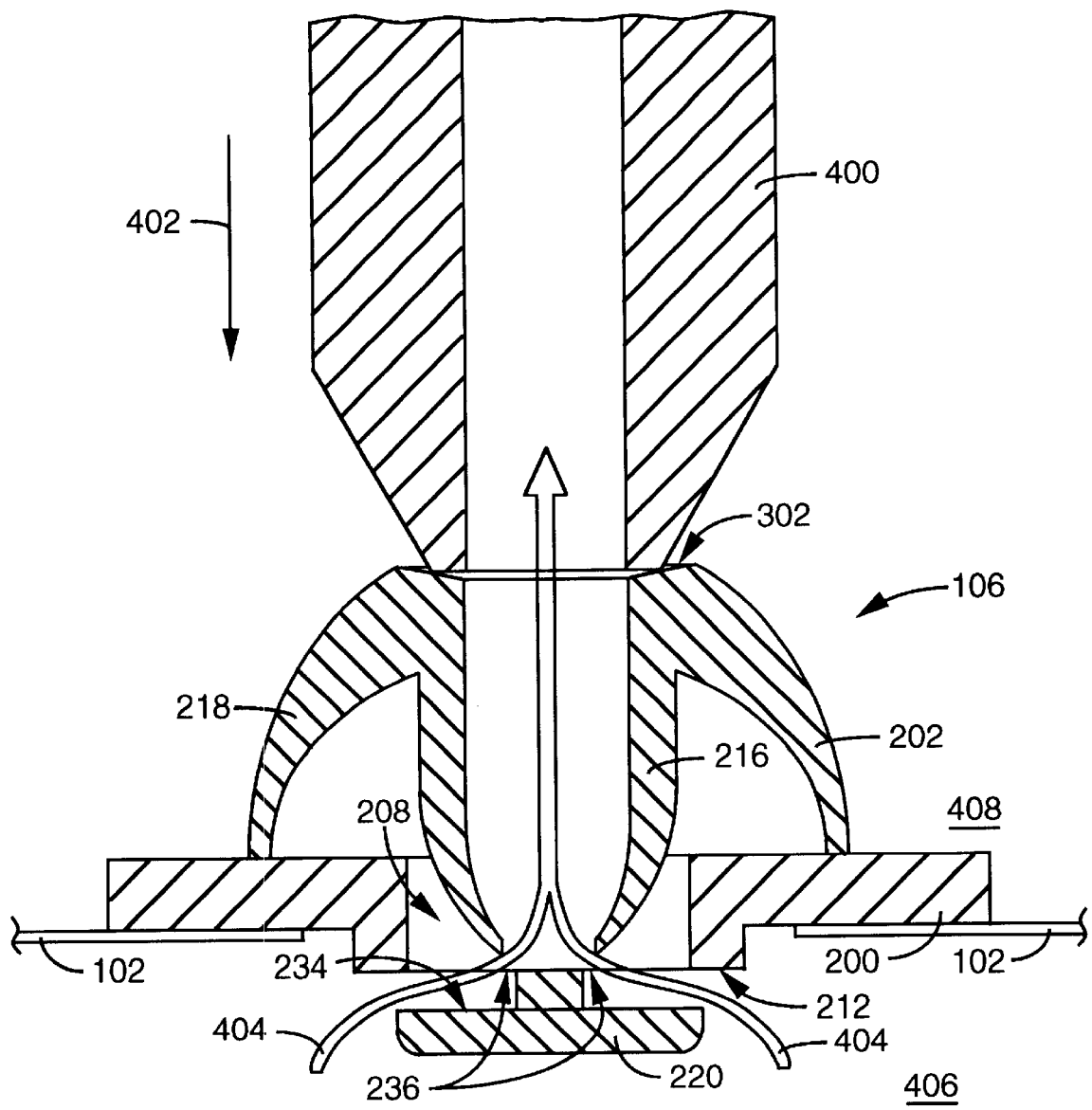
FIG. 4 is a cross-sectional view of another embodiment of the invention, illustrating valve operation.

FIG. 4 is a cross-sectional view of another embodiment of the invention, illustrating valve operation. As shown in FIG. 4, nozzle 400 is pressing down on valve assembly 106, as illustrated by arrow 402. The downward pressure from nozzle 400 pushes stem 216 farther into hole 208. As stem 216 moves downward, the airtight seal between surface 234 of valve gate 220 and valve seat face 212 is broken. Thus, a vacuum source (FIG. 5) connected to nozzle 400 draws air, illustrated by arrows 404, from the interior 406 to the exterior 406 of bag 100 (FIG. 1). When nozzle 400 is removed, the resilient force from cap 218 pulls gate 220 upwards and tightly holds surface 234 against face 212, again forming an airtight seal. The force from cap 218, acting against the top of base 200, is sufficient to overcome differential pressure between the interior 406 and exterior 408 of bag 100 after air has been removed from interior 406. The vacuum inside bag 100 is sufficient for preserving food.

The small size of the valve assembly, together with its ease of use by merely pressing to move the valve gate to the open position, is a particular advantage. This ease of use is advantageous for home use of the bag and valve assembly combination for food storage, since a food-grade vacuum can extend food shelf-life by three to five times or more. Food-grade vacuums are typically defined by local (e.g., state) health authority.

Figure 5:
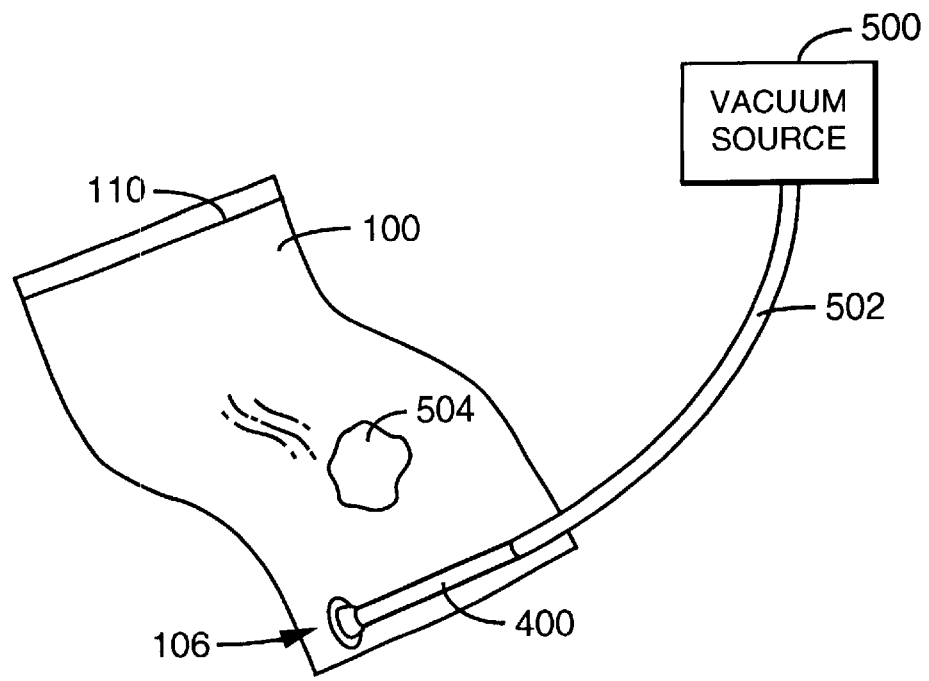
FIG. 5 is a perspective view illustrating an embodiment of the invention that includes a vacuum source.

FIG. 5 is a perspective view illustrating an embodiment of the invention that includes a vacuum source capable of drawing a food-grade vacuum. Conventional nozzle 400 is connected to conventional vacuum source 500 (e.g., a FreshSaver® Plus handheld electric piston pump, manufactured by Tilia, Inc., San Francisco, Calif.) via conventional flexible tube 502. In some embodiments, vacuum source 500 is a conventional hand-held vacuum pump. As shown in FIG. 5, a user has placed an item 504 into bag 100 and has closed airtight seal 110. The user then applies nozzle 400 against valve assembly 106. When valve assembly 106 opens, vacuum source 500 draws air from the interior of bag, thereby forming a vacuum inside bag 100. The vacuum inside bag 100 prevents air outside bag 100 from reaching item 504. Item 504 may be food or other material that is better preserved when kept from moisture or from the gasses in air.

Figure 6:
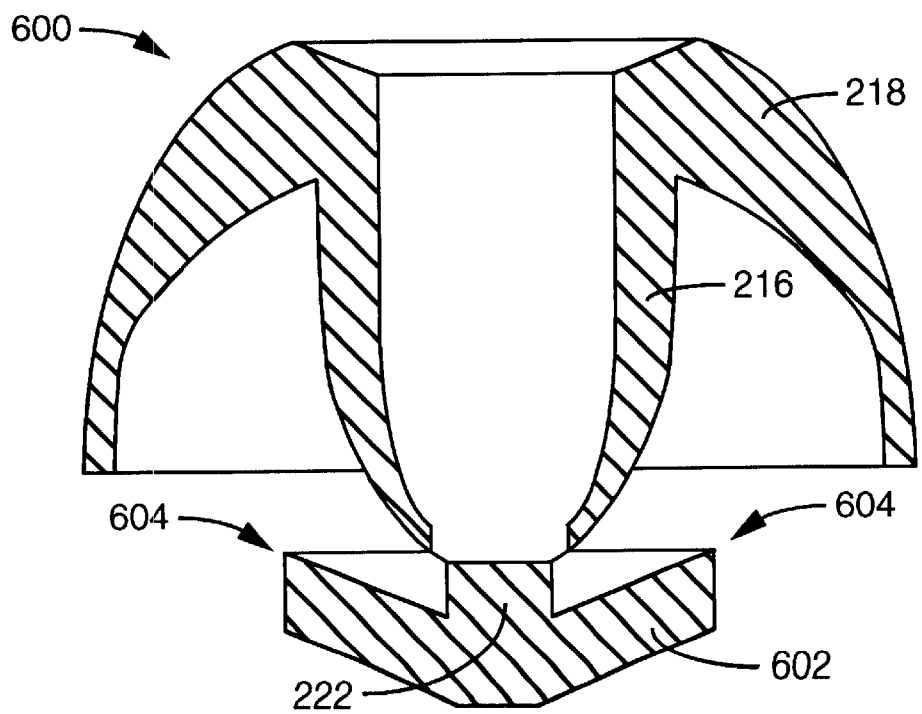
FIG. 6 is a cross-sectional view of a second alternate embodiment of the invention.

FIG. 6 is a cross-sectional view of another embodiment of a valve element 600. As shown in FIG. 6, valve gate 602 is angled so that a seal will be formed by edge 604 against seat face 212 (FIG. 2) when element 600 is mounted in base 200.

Persons familiar with storage bag systems will understand that many variations of the described embodiments exist. The invention has been described above using specific embodiments. Therefore, the invention is not limited to the specific described embodiments, but is limited only by the following claims.

We claim:
1. A valve assembly comprising:
    a base including:
        a top surface;
        a bottom surface;
        a hole extending through the base from the top to bottom surfaces;
        a seat positioned around the hole on the bottom surface, the seat having a seat face; and
        a retaining lip positioned around the hole on the top surface; and
    a valve element including:
        a stem having a first end, an opposite second end, and a neck portion extending from the first end;
        a cavity extending into the stem from the second end;
        a resilient cap having a middle portion and a distal rim, the middle portion being attached to the second end of the stem;
        a gate attached to the neck portion; and
        a second hole extending from the cavity to an outer surface of the stem;
    wherein the stem extends into the hole of the base, the distal rim of the cap engages the retaining lip, and a portion of the gate seals against the seat face.
2. The assembly of claim 1, further comprising a beveled nozzle lip around an opening of the cavity at the first end of the stem.
3. The assembly of claim 1, further comprising a plurality of second holes extending from the cavity to the outer surface of the stem.
4. The assembly of claim 1, wherein the valve element includes polyethylene.
5. The assembly of claim 1, wherein the valve element includes acrylonitrile-butadiene-styrene.
6. The assembly of claim 1, wherein the valve element includes polyvinylchloride.
7. A valve assembly comprising:
    a base including:
        a top surface;
        a bottom surface;
        a hole extending through the base from the top to bottom surfaces; and
        a seat positioned on the bottom surface adjacent the hole, the seat having a seat face; and
    a valve element including:
        a stem having a first end, an opposite second end, and a neck portion extending from the first end;
        a cavity extending into the stem from the second end;
        a resilient cap having a middle portion and a distal rim, the middle portion being attached to the second end of the stem;
        a gate attached to the neck portion; and
        a second hole extending from the cavity to an outer surface of the stem;
    wherein the stem extends into the hole of the base, the distal rim of the cap rests against the top surface of the base, and a portion of the gate seals against the seat face.

8. The assembly of claim 7, further comprising a beveled nozzle lip around an opening of the cavity at the first end of the stem.

9. The assembly of claim 7, further comprising a plurality of second holes extending from the cavity to the outer surface of the stem.

10. The assembly of claim 7, wherein the valve element includes polyethylene.

11. The assembly of claim 7, wherein the valve element includes acrylonitrile-butadiene-styrene.

12. The assembly of claim 7, wherein the valve element includes polyvinylchloride.

13. A storage system comprising:
   a bag having first and second openings into an interior of the bag, wherein a reclosable airtight seal is positioned to seal the first opening; and
   a valve assembly mounted in the second opening, the valve assembly including:
      a base including:
         a top surface;
         a bottom surface;
         a hole extending through the base from the top to bottom surfaces; and
         a seat positioned on the bottom surface adjacent the hole, the seat having a seat face; and
      a valve element including:
         a stem having a first end, an opposite second end, and a neck portion extending from the first end;
         a cavity extending into the stem from the second end;
         a resilient cap having a middle portion and a distal rim, the middle portion being attached to the second end of the stem;
         a gate attached to the neck portion; and
         a second hole extending from the cavity to an outer surface of the stem;
      wherein the stem extends into the hole of the base, the distal rim of the cap rests against the top surface of the base, and a portion of the gate seals against the seat face.

14. The storage bag of claim 13 wherein the base includes a retaining lip positioned on the top surface of the base, and the distal rim of the cap engages the retaining lip.

15. The assembly of claim 13, further comprising a beveled nozzle lip around an opening of the cavity at the first end of the stem.

16. The assembly of claim 13, further comprising a plurality of second holes extending from the cavity to the outer surface of the stem.

17. The assembly of claim 13, wherein the valve element includes polyethylene.

18. The assembly of claim 13, wherein the valve element includes acrylonitrile-butadiene-styrene.

19. The assembly of claim 13, wherein the valve element includes polyvinylchloride.

20. The system of claim 13, further comprising a vacuum source, a nozzle, and a hose connecting the vacuum source and the nozzle.

21. A method of manufacturing a valve assembly, comprising the acts of:
   providing a base, wherein the base includes:
      a top surface;
      a bottom surface;
      a hole extending through the base from the top to bottom surfaces; and
      a seat positioned on the bottom surface adjacent the hole, the seat having a seat face;
   providing a valve element, wherein the valve element includes:
      a stem having a first end, an opposite second end, and a neck portion extending from the first end;
      a cavity extending into the stem from the second end;
      a resilient cap having a middle portion and a distal rim, the middle portion being attached to the first end of the stem;
      a gate attached to the neck portion; and
      a second hole extending from the cavity to an outer surface of the stem; and
   mounting the valve element to the base, wherein the stem extends into the hole of the base, the distal rim of the cap rests against the top surface of the base, and a portion of the gate seals against the seat face.

22. The method of claim 21 further comprising the act of providing a retaining lip positioned on the top surface of the base, wherein the distal rim of the cap engages the retaining lip.

23. A method of storing an item in a vacuum, comprising the acts of:
   providing a bag, wherein the bag has first and second openings into an interior of the bag, and a reclosable airtight seal is positioned to seal the first opening;
   mounting a valve assembly in the second opening, the valve assembly including:
      a base including:
         a top surface;
         a bottom surface;
         a hole extending through the base from the top to bottom surfaces; and
         a seat positioned on the bottom surface adjacent the hole, the seat having a seat face; and
      a valve element including:
         a stem having a first end, an opposite second end, and a neck portion extending from the first end;
         a cavity extending into the stem from the second end;
         a resilient cap having a middle portion and a distal rim, the middle portion being attached to the second end of the stem;
         a gate; and
         a second hole extending from the cavity to an outer surface of the stem;
      wherein the stem extends into the hole of the base, the distal rim of the cap rests against the top surface of the base, and a portion of the gate seals against the seat face;
   placing the item to be stored into the interior of the bag;
   sealing the seal; and
   removing air from the interior of the bag through the valve assembly.

24. The method of claim 23 further comprising the act of providing a retaining lip positioned on the top surface of the base, wherein the distal rim of the cap engages the retaining lip.

25. The method of claim 23 wherein the item is food.

* * * * *